No. 739,216. PATENTED SEPT. 15, 1903.
G. PROKOFIEW.
AUTOMATIC WEIGHING MACHINE.
APPLICATION FILED MAY 12, 1903.
NO MODEL. 8 SHEETS—SHEET 1.

*Fig. 1.*

No. 739,216. PATENTED SEPT. 15, 1903.
G. PROKOFIEW.
AUTOMATIC WEIGHING MACHINE.
APPLICATION FILED MAY 12, 1903.
NO MODEL. 8 SHEETS—SHEET 2.

Fig. 2.

No. 739,216. PATENTED SEPT. 15, 1903.
G. PROKOFIEW.
AUTOMATIC WEIGHING MACHINE.
APPLICATION FILED MAY 12, 1903.
NO MODEL. 8 SHEETS—SHEET 3.

Fig. 3.

No. 739,216. PATENTED SEPT. 15, 1903.
G. PROKOFIEW.
AUTOMATIC WEIGHING MACHINE.
APPLICATION FILED MAY 12, 1903.
NO MODEL. 8 SHEETS—SHEET 4.

Fig. 4.

No. 739,216. PATENTED SEPT. 15, 1903.
G. PROKOFIEW.
AUTOMATIC WEIGHING MACHINE.
APPLICATION FILED MAY 12, 1903.
NO MODEL. 8 SHEETS—SHEET 5.

No. 739,216. PATENTED SEPT. 15, 1903.
G. PROKOFIEW.
AUTOMATIC WEIGHING MACHINE.
APPLICATION FILED MAY 12, 1903.
NO MODEL. 8 SHEETS—SHEET 6.

Witnesses: Inventor
George Prokofiew
By Knight Bros.
Attys No. 739,216. PATENTED SEPT. 15, 1903.
G. PROKOFIEW.
AUTOMATIC WEIGHING MACHINE.
APPLICATION FILED MAY 12, 1903.
NO MODEL. 8 SHEETS—SHEET 7.

No. 739,216. PATENTED SEPT. 15, 1903.
G. PROKOFIEW.
AUTOMATIC WEIGHING MACHINE.
APPLICATION FILED MAY 12, 1903.
NO MODEL. 8 SHEETS—SHEET 8.

No. 739,216. Patented September 15, 1903.

UNITED STATES PATENT OFFICE.

GEORGE PROKOFIEW, OF NORTH KENSINGTON, ENGLAND.

AUTOMATIC WEIGHING-MACHINE.

SPECIFICATION forming part of Letters Patent No. 739,216, dated September 15, 1903.

Application filed May 12, 1903. Serial No. 156,787. (No model.)

*To all whom it may concern:*

Be it known that I, GEORGE PROKOFIEW, engineer, a subject of the Emperor of Russia, residing at 16 Bracewell road, North Kensington, in the county of Middlesex, England, have invented certain new and useful Improvements in or Connected with Automatic Weighing-Machines, of which the following is a specification, reference being had to the drawings hereunto annexed and to the letters marked thereon.

The invention relates to improvements in or connected with automatic machines more especially intended for weighing granular material, and has for its object to obtain a simple and inexpensive machine which will efficiently do the work of the more complex and costly mechanisms at present employed for that purpose.

In the accompanying drawings.

In the several figures like parts are indicated by similar letters of reference, and Figs. 1 to 5 and 8 and 16 and 17 are drawn to a reduced scale with respect to the other figures of the drawings.

$a$ represents the base-plate of the machine.

$b$ represents the main frame, which is bolted to the base-plate $a$.

$c$ represents the main or driven shaft of the machine, and $d$ represents the counter-shaft. The main shaft $c$ is provided with a grooved pulley $c'$, through which it may be constantly driven by a band from any suitable motor, and it is also provided with a detachable crank-handle $c^2$, by the aid of which it may be driven by hand when desired.

Fixed upon the main shaft $c$ is a spur-wheel $c^3$, and fixed upon the counter-shaft $d$ is a pinion $d'$, which gears with the spur-wheel $c^3$, by which means an accelerated motion is transmitted from the main shaft $c$ to the counter-shaft $d$.

At the side of the frame $a$ is fixed by a bracket $e'$ a hopper $e$, into which the material to be weighed is deposited, and the lower end or mouth of the hopper $e$ is adapted to be closed and opened at the times desired by a sliding shutter or valve $e^2$, hereinafter more fully described.

Below the mouth of the hopper $e$ is arranged a scale-beam $g$, which is fixed with an axle $g'$, provided with V-centers $g^2$, working in bearings $f^2$, formed in a forked frame $f'$, carried by a pillar $f$, bolted to the base-plate $a$, and at one end thereof the beam $g$ is provided with a tray or receptacle $g^3$, suspended by links $g^4$, having knife-edges from V-centers in the beam $g$ and intended for the reception of weights, and at the other end the beam $g$ is provided with similarly-suspended loops or stirrups $g^5$, which receive horizontal trunnions, studs, or projections $h'$, fixed to a bucket $h$ near to the mouth thereof, so that the said bucket, which is arranged beneath the mouth of the hopper $e$, may at the times desired hang suspended from the scale-beam. The bucket $h$ is at the bottom thereof provided with similar studs or projections $h^2$, which work in vertical open-ended guide-slots $i'$, formed in a supplemental frame or standards $i$, fixed to the base-plate $a$. The upper ends of the standards $i$ are formed with notches or bearings $i^2$, and when the required weight of material flowing from the hopper $e$ is deposited in the bucket $h$ and that end of the scale-beam $g$ consequently descends the upper studs $h'$ of the bucket $h$ in the descent of the latter engage the notches or bearings $i^2$ of the standards $i$, and in the further descent of the scale-beam $g$, which is accomplished by the means hereinafter described, the loops or stirrups $g^5$ of the scale-beam $g$ are disengaged from the upper trunnions or studs $h'$ of the bucket $h$, leaving the same supported by the notches or bearings $i^2$ of the standards $i$ perfectly free of the scale-beam $g$. The bottom of the bucket $h$ is closed by a shutter or valve $h^5$, sliding in guide-grooves $h^4$, formed in a rectangular frame $h^3$, carried by the bucket $h$, and when the required weight of material in the bucket $h$ is reached and the hopper-valve $e^2$ is closed, as hereinafter described, the bucket-valve $h^5$ is suddenly opened to discharge the contents of the bucket $h$ into a suitable receptacle placed beneath by an arm or lever $j$, suspended from an axis of motion $j'$ and at its lower end cranked to engage a notched projection $h^6$, fixed to the under side of the shutter or valve $h^5$, and which is actuated to open said valve by a laterally-projecting pin $k^5$ upon a wheel or cylinder $k$, hereinafter described, while the valve $h^5$ is subsequently closed and is normally so retained by a spring $j^2$, which acts upon the suspended arm or lever $j$.

Upon a stud $k^*$ at the side of the frame $b$ below the hopper $e$ is mounted, with capability of revolution, the wheel or cylinder $k$, hereinafter called the "cam-wheel" or "cylinder," the periphery of which is covered with india-rubber or the like, and said cam-wheel or cylinder at a given point of its circumference is formed with a depression $k'$, and upon the end of the main shaft $c$ of the machine is fixed a roughened wheel $c^4$, and in the normal position of the parts—that is to say, when the hopper-valve $e^2$ is open—the depression $k'$ of the cam-wheel or cylinder $k$ coincides with the roughened wheel $c^4$, as shown more particularly at Figs. 2, 5, 6, 11, and 16, so that no motion is given by the roughened wheel $c^4$ to the cylinder $k$.

Projecting from the cam-wheel or cylinder $k$ at right angles to its axis $k^*$ is an arm or lever $k^2$ at its end, formed curved on its upper edge and constituting a ratchet-like tooth $k^3$.

Fixed with the bracket $e'$ is a horizontal rod $l^3$, upon which is mounted, with capability of sliding for adjustment, a forked frame-like fitting $l^2$, in the ends or sides of which are mounted upon V-centers $l'$ the ends of the axle-like upper part of a swinging support $l$, the lower end of which is formed with a laterally-disposed step or tooth $l^4$, which in the normal or weighing position of the parts engages the tooth $k^3$ of the arm or lever $k^2$ of the cam-wheel or cylinder $k$, and thus retains said cam-wheel $k$ in its initial position, as shown more particularly at Figs. 2, 5, 6, 11, and 16, and in order to prevent the support $l$ swinging in one direction out of the path of the tooth or projection $k^3$ of the arm or lever $k^2$ of the cam-wheel or cylinder $k$ a stop $f^3$, supported from the frame $f'$ of the pillar $f$, is provided, and this stop is cranked, so as to engage the swinging support $l$ in about its central vertical line.

Fixed with the scale-beam $g$ near its axle $g'$ is a vertical downward projection or indicator $g^6$, and formed on the swinging support $l$ is a lateral projection or finger $l^5$, one side of which is engaged by the downward projection or indicator $g^6$, while a light spring $g^7$, carried by said projection $g^6$, engages the other side of the lateral projection or finger $l^5$ of the swinging support $l$ and controls the movements of the latter within certain limits.

Figures 11, 12:
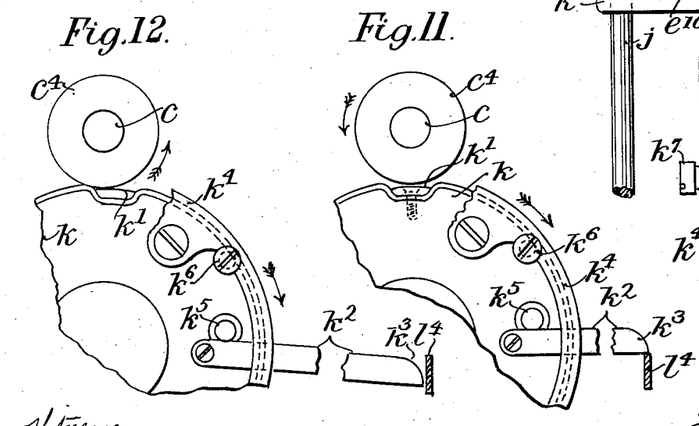
Fig. 11 is a detail view of the cam-wheel or cylinder and roughened wheel, showing the arm of the cam-wheel engaged by the swinging support and the recess in the cam-wheel or cylinder opposite the roughened wheel, those being the positions of said parts until the required weight is reached.
Fig. 12 is a similar view, but showing the arm of the cam-wheel or cylinder released from the swinging support and the cam-wheel in engagement with the roughened wheel.
Figures 13, 14, 15, 16, 17, 18, 19:
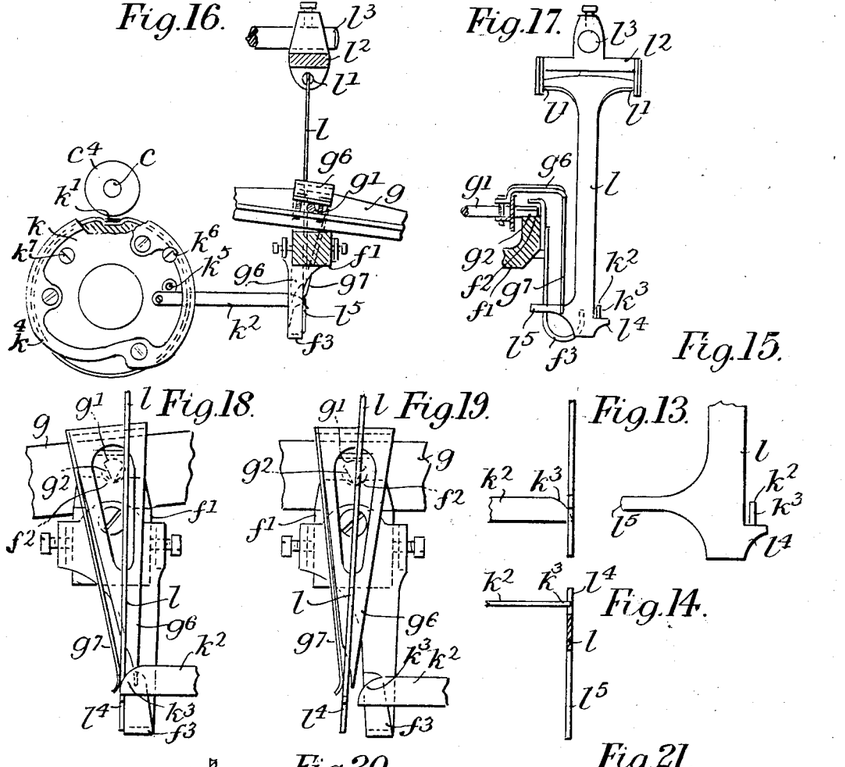
Fig. 13 is a side view of parts showing the arm of the cam-wheel or cylinder engaged by the swinging support.
Fig. 14 is a plan thereof.
Fig. 15 is a rear end view thereof.
Fig. 16 is a detail view of some parts in their initial positions.
Fig. 17 is an end view of part of Fig. 16.
Fig. 18 is a detail view of some parts of Fig. 2, but looking from the opposite side.
Fig. 19 is a similar view, but showing the positions assumed by the parts after the required weight is reached.
Figure 20:
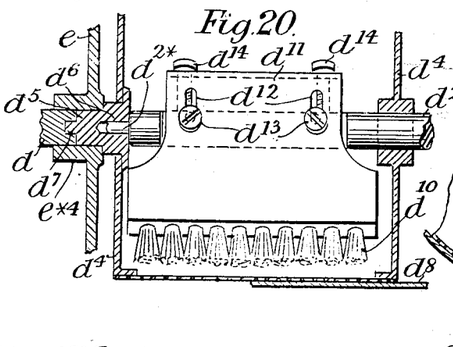
Fig. 20 is a face view of the brush and connected parts separately.
Figure 21:
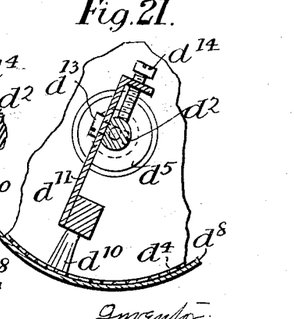
Fig. 21 is an end or side view thereof.

When the required weight of material flowing into the bucket $h$ is reached and that end of the scale-beam $g$ is consequently depressed and the downward projection $g^6$ thereon by its movement disengages the step $l^4$ of the swinging support $l$ from the tooth $k^3$ of the arm or lever $k^2$ of the cam-wheel or cylinder $k$ and said arm $k^2$ by its weight gives a partial rotation to the cam-wheel or cylinder $k$, thereby bringing its periphery adjacent to the depression $k'$ into engagement with the roughened wheel $c^4$, as shown more particularly at Fig. 12, with the result that the cam-wheel or cylinder $k$ is rotated until the depression $k'$ thereof again coincides with the roughened wheel $c^4$, when said motion ceases and the tooth $k^3$ of the arm or lever $k^2$ of the cam-wheel or cylinder $k$ again comes into engagement with the step or tooth $l^4$ of the swinging support $l$.

Figure 8:
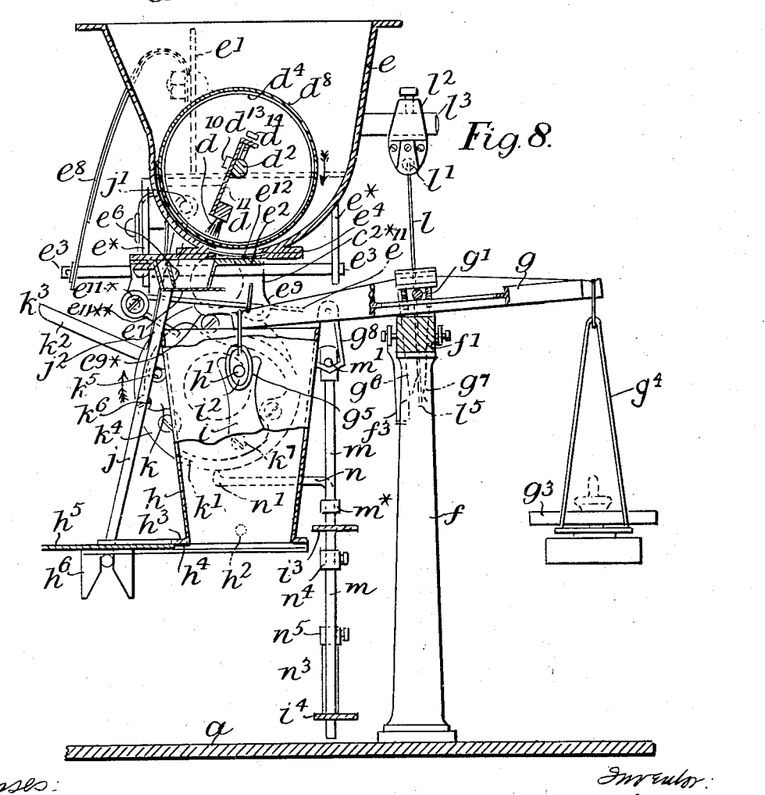
Fig. 8 is a vertical section, taken on the line 2 2 of Fig. 1, of part of the machine, but showing the scale-beam in its lowest position, the hopper-valve closed after the completion of the weighing operation, and the bucket-valve opened to discharge the contents of the bucket.

The cylinder or cam-wheel $k$ has fixed upon the side or face thereof a cam $k^4$, and the scale-beam $g$ is at a suitable point between its axis $g'$ and the bucket $h$ provided with a loop $g^8$, in which works a stud $m'$, projecting laterally from a vertical rod $m$, which is by a strap $m^*$ fixed with another and parallel but shorter vertical rod $n$ at its upper end $n'$, cranked to engage the cam $k^4$ of the cam-wheel or cylinder $k$, by which both rods $m$ $n$ are depressed at the times desired against the force of a spring $n^3$, coiled around the rod $n$ and which acts to restore said rods to their normal position. The rods $m$ $n$ are mounted with capability of vertically sliding in guides formed in the limbs $i^3$ $i^4$ of a bracket $i^5$, fixed to the side of one of the standards $i$, and upon the rod $n$ are fixed collars $n^4$ $n^5$, the former of which coacts with the limb $i^3$ of the bracket $i^5$ to limit the upward movement of the rods $m$ $n$, and the other, $n^5$, serves as a projection for one end of the spring $n^8$ to act against, while the limb $i^4$ of the bracket $i^5$ serves as an abutment to the other end thereof. In the revolution of the cam-wheel or cylinder $k$ the cam $k^4$, through the cranked end $n'$ of the short rod $n$, depresses both rods $m$ $n$, and the lateral projection or stud $m'$ of the long rod $m$ engages the lower part of the loop $g^8$, and thereby depresses the scale-bucket end of the scale-beam $g$, and by reason of the shape of the cam $k^4$ thus for the time being retains said beam, causing the bucket $h$, by its upper studs or trunnions $h'$, to rest in the notches or bearings $i^2$ of the standards $i$ free of the loops or stirrups $g^5$ of the scale-beam $g$, as hereinbefore described and as shown at Fig. 8. In the further revolution of the cam-wheel or cylinder $k$ the laterally-projecting pin or stud $k^5$ thereon engages the pivotally-suspended arm $j$ and traverses the same, so that it opens the valve or shutter $h^5$ of the bucket $h$, as shown at Fig. 8, and discharges its contents, and in the further revolution of the cam-wheel or cylinder $k$ the pin or stud $k^5$ recedes from the suspended arm $j$, permitting the spring $j^2$ to restore the same to its normal position and close the valve or shutter $h^5$ of the bucket $h$, and immediately afterward the cam $k^4$ permits the short sliding rod $n$ to rise under the influence of the spring $n^3$, allowing the scale-beam $g$ to rise also, during which movement the loops or stirrups $g^5$ engage the upper studs or trunnions $h'$ of and pick up and hold suspended the bucket $h$ ready for the next operation.

Figure 1:
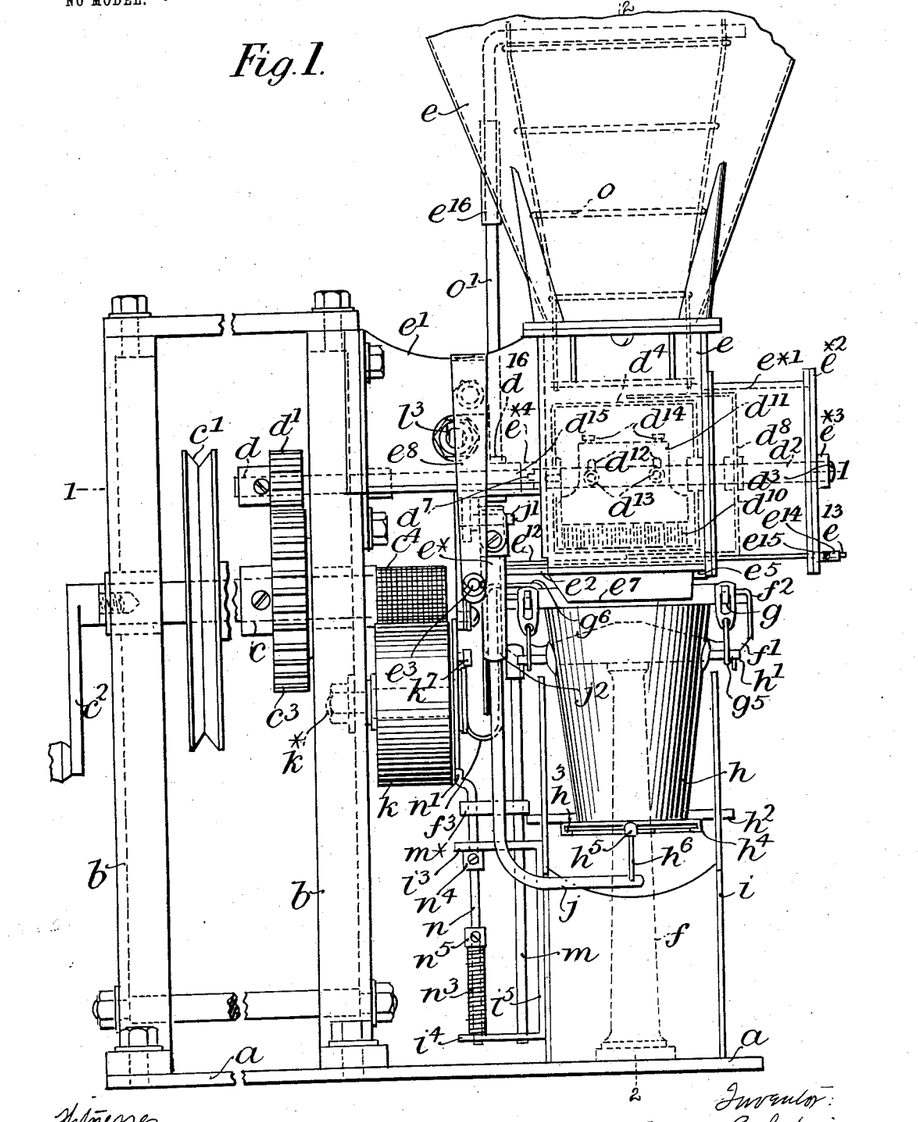
Figure 1 is a front elevation of a weighing-machine constructed according to the present invention and showing the parts in their initial positions.
Figure 2:
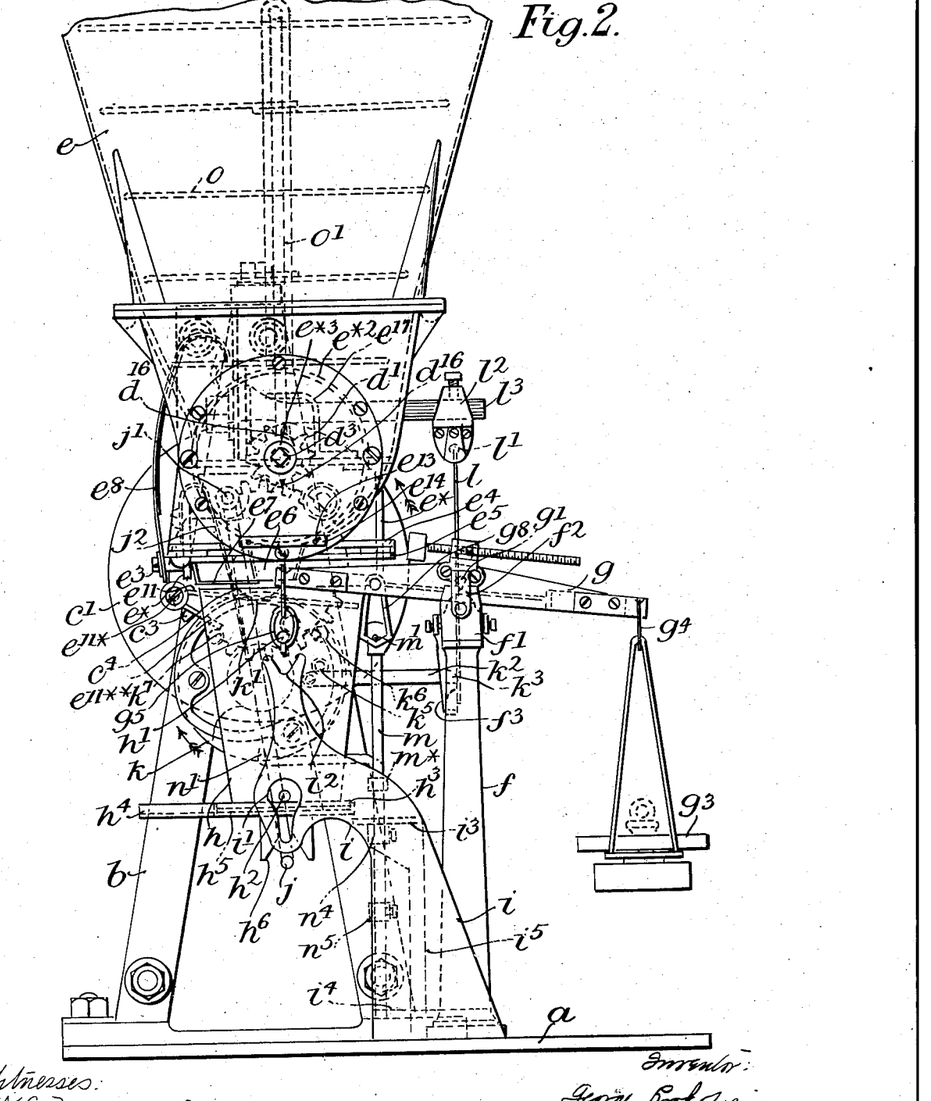
Fig. 2 is a side elevation thereof.
Figure 3:
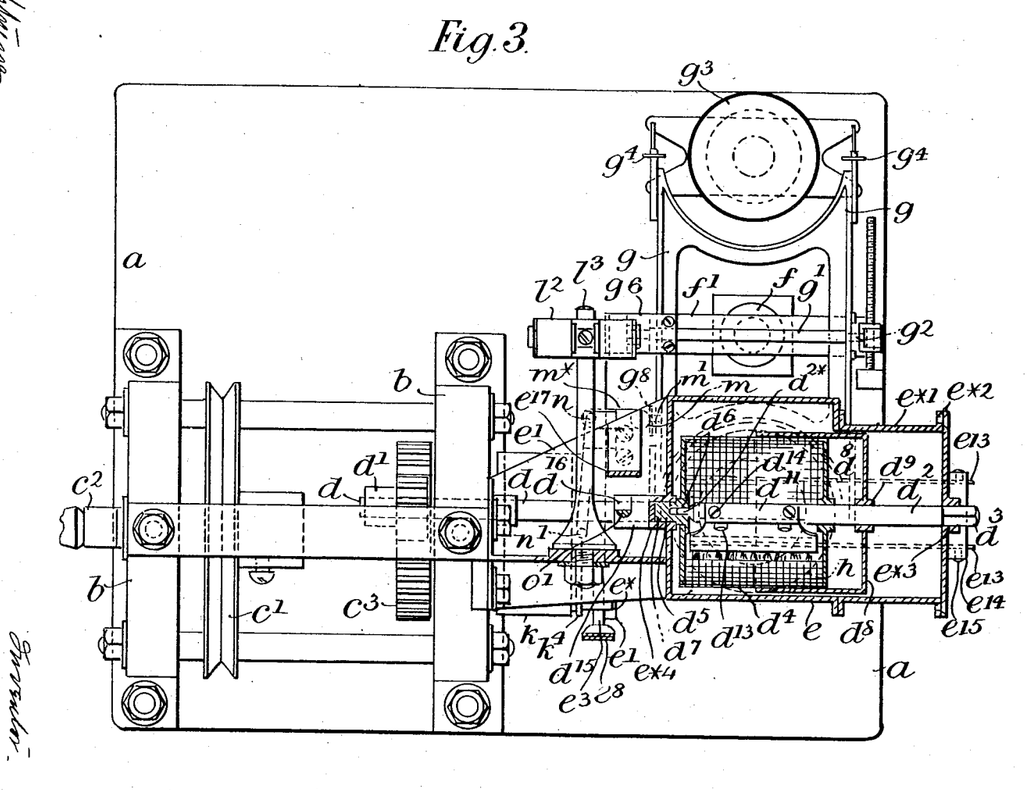
Fig. 3 is a horizontal section taken on the line 1 1 of Fig. 1.
Figure 4:
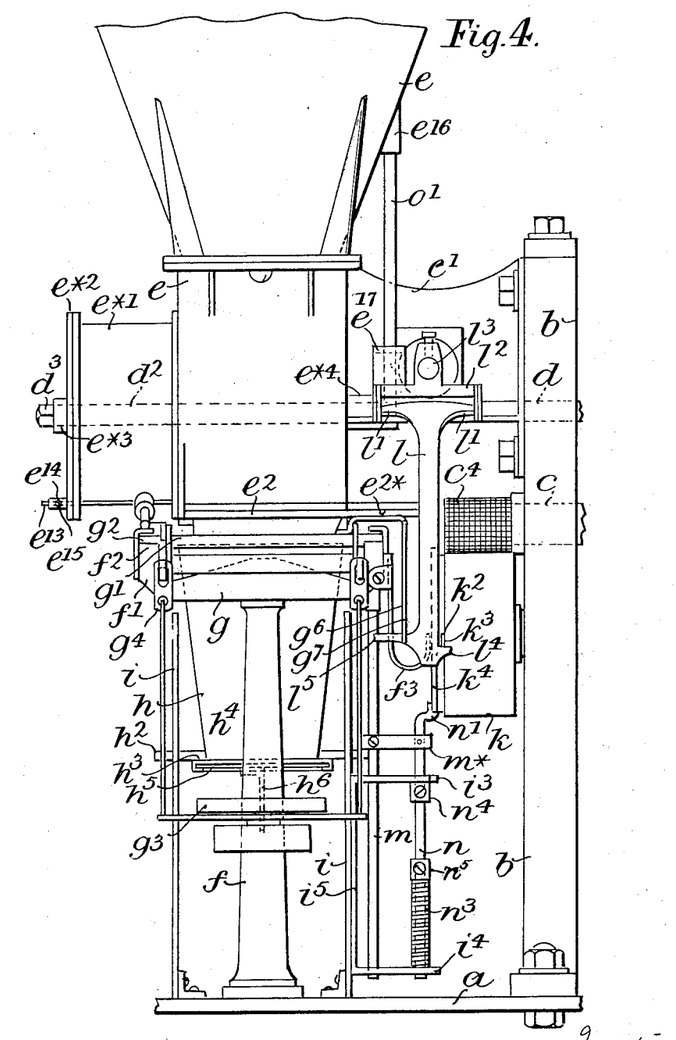
Fig. 4 is a rear elevation of part of the machine.
Figures 5, 7:
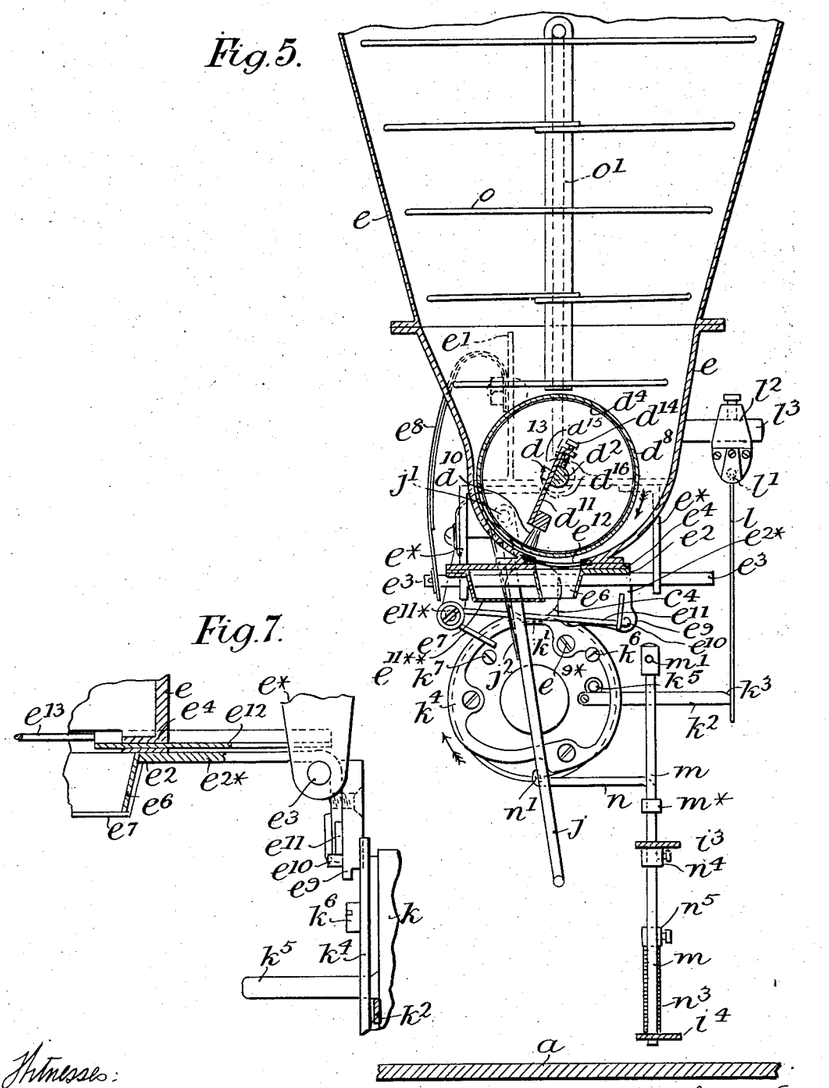
Fig. 5 is a vertical section of parts, the section being taken on the line 2 2 of Fig. 1.
Fig. 7 is a sectional end view of part of Fig. 6, the section being taken on the line 3 3 of said figure.
Figure 6:
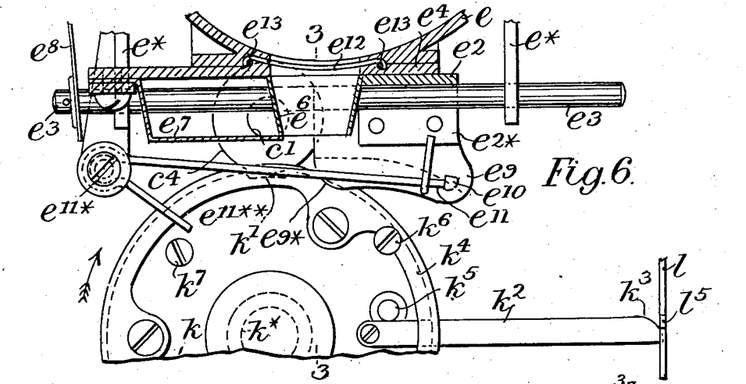
Fig. 6 is a detail view of part of Fig. 5.
Figure 9:
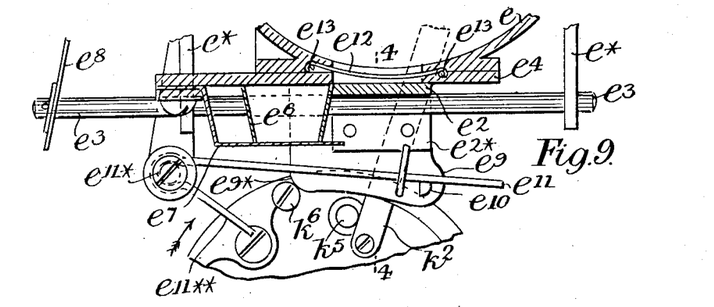
Fig. 9 is a sectional view of parts, the section being taken on the line 2 2 of Fig. 1, showing the positions of some of the parts when the hopper-valve is just about to be opened.
Figure 10:
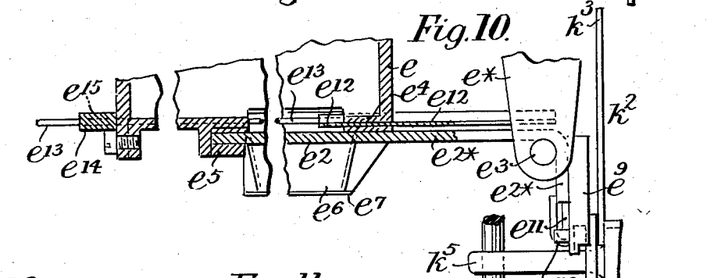
Fig. 10 is a sectional end view of parts, the section being taken on the line 4 4 of Fig. 9.

In order that the hopper-valve $e^2$ may be closed and the flow of material cut off immediately that the required weight of material is deposited in the bucket $h$ and subsequently opened when the parts are restored to their normal positions, the following arrangement of parts is employed. Mounted with capability of sliding in bearings formed in brackets $e^*$ from the bracket $e'$ is a rod $e^3$, to which the valve $e^2$ is by a lateral extension $e^{2*}$ fixed, and beneath the mouth of the hopper is fixed an apertured plate $e^4$, against which the upper side of the valve $e^2$ works, while it slides horizontally in guides $e^5$, carried by said plate. Fixed with the valve or shutter $e^2$ is a short funnel $e^6$, which in the open position of the valve receives and guides the material flowing from the hopper into the bucket $h$, and in the closed position of the valve $e^2$ the funnel $e^6$ slides between the plate $e^4$ and a plate $e^7$, carried by the latter, and any material at that moment within the funnel $e^6$ and possibly adhering to the walls thereof is thereby confined therein until the valve $e^2$ is again opened, and thus the possibility of some material being shaken out of the funnel by the closing of the valve and after the required weight is reached is avoided. The sliding rod $e^3$ is acted upon by a spring $e^8$ to close the sliding shutter or valve $e^2$, and fixed with the rod $e^3$ is a plate-lug or projection $e^9$, and upon the cam-wheel or cylinder $k$ is a laterally-projecting stud $k^6$, which in the revolution of the cam-wheel or cylinder $k$ comes against the rounded corner $e^{9*}$ of said lug, as shown at Fig. 9, and traverses the sliding rod $e^3$ and opens the valve $e^2$. Pivotally mounted at $e^{11*}$ upon an extension of one of the brackets $e^*$ is a finger or detent $e^{11}$, which in the open position of the valve or shutter $e^2$ engages a laterally-projecting stud $e^{10}$ on the plate or lug $e^9$ of the rod $e^3$, and thereby retains the valve or shutter $e^2$ in its open position, as shown at Figs. 5 and 6, until in the further revolution of the cam-wheel or cylinder $k$ a pin or stud $k^7$ upon said cam-wheel comes against a tail or projection $e^{11**}$ upon the finger or detent $e^{11}$ and disengages the latter from the stud or projection $e^{10}$ of the lug $e^9$ of the rod $e^3$, thus permitting the spring $e^8$ to act and suddenly close the valve or shutter $e^2$.

The hopper-mouth is provided with a horizontally-adjustable shutter $e^{12}$, by the aid of which the area of the opening in said mouth may be regulated according to the nature of the material being weighed, and this shutter has fixed thereto rods $e^{13}$, which pass through perforations in the end plate or cap $e^{*2}$ of a lateral extension $e^{*'}$ of the lower part of the hopper $e$, and upon the exterior thereof are coupled by a block or strap $e^{14}$, through which they pass and which is adjustable thereon by means of set-screws $e^{15}$.

When weighing some kinds of material, such as flour or cocoa, which are liable to pack, the lower part of the hopper $e$ immediately above the valve $e^2$ is formed curved or semicircular in shape and provided with a lateral cylindrical extension $e^{*'}$, closed by a cap or cover $e^{*2}$. Passing through this semicircular part and extension $e^{*'}$ is a shaft $d^2$ at one end mounted in and held stationary by a square $d^3$ thereon engaging a correspondingly-shaped perforation in a boss $e^{*3}$ upon the cover $e^{*2}$, and upon this fixed shaft is mounted, with capability of revolution, a cylindrical sieve $d^4$, having imperforate ends and at one end provided with a boss $d^5$, in which is formed a recess or bearing $d^6$, and the corresponding end of the fixed shaft $d^2$ is at $d^{2*}$ reduced and formed to fit the bearing $d^6$. The boss $d^5$ of the sieve $d^4$ is prolonged and runs in a sleeve or bearing $e^{*4}$, carried by the hopper $e$, and the corresponding end of the counter-shaft $d$ also runs in said bearing, and the meeting ends of the counter-shaft $d$ and boss $d^5$ are coupled by means of a clutch $d^7$, so that the counter-shaft $d$, which is constantly driven, gives a continuous rotary movement to the cylindrical sieve $d^4$.

Fitting upon the cylindrical sieve $d^4$, with capability of sliding endwise thereof, but so as to revolve therewith, is an imperforate cylinder or regulator $d^8$, open at one end and closed at the other by a disk $d^9$, axially perforated to slide upon the fixed shaft $d^2$, so that the cylinder $d^8$ may be adjusted to more or less inclose the cylindrical sieve $d^4$, and thus regulate the area thereof exposed and in action, according to the nature of the material being weighed, and correspondingly regulate the flow of said material through the hopper, the lateral extension $e^{*\prime}$ of the hopper $e$ admitting of the necessary adjustment of the regulator $d^8$.

Within the cylindrical sieve $d^4$ is a brush $d^{10}$, which is preferably narrow and in length coextensive or thereabout with said sieve, and this brush $d^{10}$ is mounted on a holder $d^{11}$, which fits upon a flat formed on the fixed shaft $d^2$ and is there adjustably secured by means of binding-screws $d^{13}$, passing through slots $d^{12}$ in the holder $d^{11}$ and screwing into tapped holes in the shaft $d^2$, while the rear end of the holder $d^{11}$ is cranked and perforated with tapped holes, in which are fitted set-screws $d^{14}$, which impinge upon the shaft $d^2$, and by these means the brush, which is held stationary with the shaft $d^2$, may be adjusted in the required manner with relation to the cylindrical sieve $d^4$. The office of the brush $d^{10}$ is to sweep the revolving sieve $d^4$ immediately over or slightly to the rear, with relation to the direction of motion of the sieve, of the outlet from the hopper-mouth, and thus clear the meshes of the sieve, and the office of the sieve $d^4$ is to break up the material as it passes to the mouth of the hopper, and these devices combined cause the material to flow evenly and continuously from the hopper $e$.

In order to assist the steady flow of the material through the hopper $e$, a skeleton frame $o$, shaped to neatly fit the walls of the hopper $e$, is provided, and this frame is carried by the upper end of a vertical rod $o'$, which passes through guides $e^{16}$ $e^{17}$ and at its lower end engages the cam-like teeth $d^{16}$ of a wheel $d^{15}$, fixed upon the counter-shaft $d$, and the frame $o$ is thus intermittently reciprocated or vibrated, thereby detaching the material from the walls of the hopper and causing the same to flow more evenly.

By the means hereinbefore described many of the disadvantages of automatic weighing-machines are overcome, among which may be named that up to the moment when the required weight of material in the bucket $h$ is reached the scale-beam $g$ is entirely unconnected with and is entirely unaffected by the general moving mechanism of the machine, and consequently greater accuracy in weighing is possible, and after the required weight is reached the bucket $h$ is supported independently of the scale-beam $g$ while it is being discharged, and thus the scale-beam is not subjected to the vibrations and shocks necessarily incidental to opening and closing the valve of the bucket.

It will be understood that any other suitable receptacle than the bucket hereinbefore described arranged to discharge in any suitable way by tilting or otherwise and any other suitable weighing apparatus may be employed in connection with means for isolating said weighing apparatus at certain periods.

Having now particularly described and ascertained the nature of the said invention and in what manner the same is to be performed, I declare that what I claim is—

1. In a weighing-machine a constantly-driven shaft, a roughened wheel on said shaft, a cam-wheel adapted to engage the roughened wheel and having a depression in its periphery, an arm, fixed with the cam-wheel, a pivotal support adapted to engage the arm of the cam-wheel when the depression of the latter is coincident with the roughened wheel, a hopper into which the material to be weighed is fed, a valve controlling the mouth of the hopper, a weighing member arranged beneath the hopper having a scale-receptacle into which the material from the hopper flows, means actuated by the weighing member for disengaging the pivotal support from the arm of the cam-wheel when the required weight of material is deposited in the receptacle thus permitting said arm to turn the cam-wheel until its periphery engages and is driven by the roughened wheel and means actuated by projections on the cam-wheel for closing the valve of hopper and discharging the scale-receptacle and again restoring said parts to their normal positions by the time the depression of the cam-wheel again arrives opposite the roughened wheel and its arm or lever again engages the swinging support substantially as herein shown and described and for the purpose stated.

2. In a weighing-machine, a constantly-driven shaft, a roughened wheel on said shaft, an eccentrically-weighted cam-wheel adapted to engage the roughened wheel and having a depression in its periphery, a detent adapted to lock the cam-wheel when the depression of the latter is coincident with the roughened wheel, a hopper into which the material to be weighed is fed, a valve controlling the mouth of the hopper, a weighing member arranged beneath the hopper having a scale-receptacle into which the material from the hopper flows, means actuated by the weighing member for disengaging the detent from the cam-wheel when the required weight of material is deposited in the receptacle, thus permitting the cam-wheel to turn by gravity until its periphery engages and is driven by the roughened wheel, and means actuated by the cam-wheel for closing the valve of the hopper and discharging the scale-receptacle and again restoring said parts to their normal positions by the time the depression of the cam-wheel again arrives opposite the roughened wheel and is locked by the detent, substantially as herein shown and described and for the purpose stated.

3. In a weighing-machine a constantly-driven shaft, a roughened wheel on said shaft, a cam-wheel adapted to engage the roughened wheel and having a depression in its periphery, a hopper into which the material to be weighed is fed, a sliding valve controlling the mouth of the hopper, a weighing member arranged beneath the hopper having a bucket or receptacle into which the material from the hopper flows, means actuated by the weighing member when the required weight is deposited in the bucket or receptacle for turning the cam-wheel until its periphery engages and is driven by the roughened wheel, a spring for closing the hopper-valve, a pin upon the cam-wheel for opening said valve when the parts are in their normal positions, a detent for retaining the valve in its open position, a pin or stud upon the cam-wheel for tripping the detent when the required weight of material is deposited in the bucket or receptacle and permitting the hopper-valve to close under the influence of the spring, means actuated by the cam-wheel for discharging the bucket or receptacle and means for restoring the parts to their normal or weighing positions by the time the depression of the cam-wheel again arrives opposite the roughened wheel substantially as herein shown and described and for the purpose stated.

4. In a weighing-machine a constantly-driven shaft, a roughened wheel on said shaft, a cam-wheel adapted to engage the roughened wheel and having a depression in its periphery, a hopper into which the material to be weighed is fed, a valve controlling the mouth of the hopper, a weighing member arranged beneath the hopper and having a bucket into which the material from the hopper flows, means actuated by the weighing member, when the required weight is deposited in the bucket, for turning the cam-wheel until its periphery engages and is driven by the roughened wheel, means for closing the hopper-valve, a sliding valve or shutter closing the mouth of the bucket, a pivotally-suspended arm or lever engaging said valve, a spring acting upon said lever in one direction to close the valve, a pin or stud upon the cam-wheel acting upon said lever to open the valve when the required weight is reached and means for restoring the parts to their normal or weighing position by the time the depression of the cam-wheel again arrives opposite the roughened wheel substantially as herein shown and described and for the purpose stated.

5. In a weighing-machine a constantly-driven shaft, a hopper, a valve controlling the mouth of the hopper, a weighing member arranged beneath the hopper having a scale bucket or receptacle into which the material from the hopper flows, a hopper-valve and means brought into engagement with the driven shaft by the depression of the weighing member when the required weight is reached to actuate the hopper-valve, isolate the scale bucket or receptacle from the weighing member, discharge the contents thereof, and subsequently restore said parts to their normal positions substantially as herein shown and described and for the purpose stated.

6. In a weighing-machine a constantly-driven shaft, a roughened wheel on said shaft, a cam-wheel adapted to engage the roughened wheel and having a depression in its periphery, a hopper into which the material to be weighed is fed, a valve controlling the mouth of the hopper, a weighing member arranged beneath the hopper having a scale bucket or receptacle into which the material from the hopper flows, means actuated by the weighing member when the required weight of material is deposited in the scale-receptacle for turning the cam-wheel until its periphery engages and is driven by the roughened wheel and means actuated by the cam-wheel when the required weight is reached for closing the said valve of the hopper isolating the said scale-receptacle from the weighing member, discharging its contents and again restoring said parts to their normal positions by the time the depression of the cam-wheel again arrives opposite the roughened wheel substantially as herein shown and described and for the purpose stated.

7. In a weighing-machine a constantly-driven shaft, a roughened wheel on said shaft, a cam-wheel adapted to engage the roughened wheel and having a depression in its periphery, an arm fixed with the cam-wheel, a pivotal support adapted to engage the arm of the cam-wheel when the depression of the latter is coincident with the roughened wheel, a hopper into which the material to be weighed is fed, a valve controlling the mouth of the hopper, a weighing member arranged beneath the hopper and consisting of a pivotally-mounted weighing member having a receptacle for weights at one end and a bucket or receptacle at the other into which the material from the hopper flows, a projection from the weighing member for acting upon and disengaging the pivotal support from the arm of the cylinder or cam-wheel when the required weight of material is deposited in the bucket or receptacle thus permitting said arm to turn the cam-wheel until its periphery engages and is driven by the cam-wheel, means actuated by the roughened wheel for closing the hopper-valve and opening the valve of the bucket and means for restoring the parts to their normal positions by the time the depression of the cam-wheel again arrives opposite the roughened wheel and its arm again engages the pivotal support substantially as herein shown and described and for the purpose stated.

8. In a weighing-machine a constantly-driven shaft, a roughened wheel on said shaft, a cam-wheel adapted to engage the roughened wheel and having a depression in its periphery, an arm fixed with the cam-wheel, a pivotal support adapted to engage the arm, of the cam-wheel when the depression of the latter is coincident with the roughened wheel, a hopper into which the material to be weighed is fed, a valve controlling the mouth of the hopper, a weighing member arranged beneath the hopper and consisting of a pivotally-mounted weighing member having a receptacle for weights at one end and a bucket or receptacle for the material at the other, loops at that end of the weighing member, trunnions upon the upper part of the bucket engaging said loops, standards having notched bearings located beneath the trunnions adapted to receive the same, a projection from the weighing member for disengaging the pivotal support from the arm, of the cam-wheel when the required weight of material is deposited in the bucket thus permitting said arm to turn the cam-wheel until its periphery engages the roughened wheel, means actuated by the cam-wheel for closing the valve of the hopper, a cam upon the cam-wheel, means actuated by said cam for depressing the bucket end of the weighing member leaving the bucket suspended by the notched bearings free of the weighing member, a valvular bottom to the bucket, means actuated by the cam-wheel for opening and closing said valve, and means for restoring the parts to their normal positions by the time the cam-wheel again arrives opposite the roughened wheel and its arm again engages the pivotal support substantially as herein shown and described and for the purpose stated.

9. In a weighing-machine a constantly-driven shaft, a roughened wheel on said shaft, a cam-wheel adapted to engage the roughened wheel and having a depression in its periphery, a hopper into which the material to be weighed is fed, a valve controlling the mouth of the hopper, a spring for closing said valve, a detent for holding the same open, a weighing member having a bucket or receptacle at its bottom closed by a sliding valve and into which the material from the hopper flows, a spring for closing said valve, means actuated by the weighing member when the required weight of material is deposited in the bucket or receptacle for turning the cam-wheel until its periphery engages and is driven by the roughened wheel and means actuated by the cam-wheel for releasing the detent, permitting the spring to act closing the valve of the hopper and opening the valve of the bucket or receptacle and discharging its contents when the required weight is reached and again restoring said parts to their normal positions by the time the depression of the cam-wheel again arrives opposite the roughened wheel substantially as herein shown and described and for the purpose stated.

10. In a weighing-machine a hopper into which the material is fed, a weighing member beneath the hopper, a constantly-driven cylindrical sieve within the hopper immediately above the hopper-mouth and an adjustably-fixed brush carried by the axis of the sieve and arranged to sweep the sieve adjacent to the hopper mouth or outlet substantially as herein shown and described and for the purpose stated.

11. In a weighing-machine a hopper into which the material is fed, a weighing member beneath the hopper, a constantly-driven cylindrical sieve within the hopper immediately above the hopper-mouth, an adjustably-fixed brush carried by the axis of the sieve and arranged to sweep the sieve adjacent to the hopper mouth or outlet and means for regulating the area of the cylindrical sieve in action and consisting of an adjustable imperforate cylinder adapted to more or less inclose the sieve substantially as herein shown and described and for the purpose stated.

12. In a weighing-machine a hopper into which the material is fed, a weighing member beneath the hopper, a skeleton frame within the hopper and nearly fitting the walls thereof and means for vertically reciprocating said frame as herein shown and described and for the purpose stated.

GEORGE PROKOFIEW.

Witnesses:
C. MELBOURNE WHITE,
C. H. WHITE.